United States Patent Office.

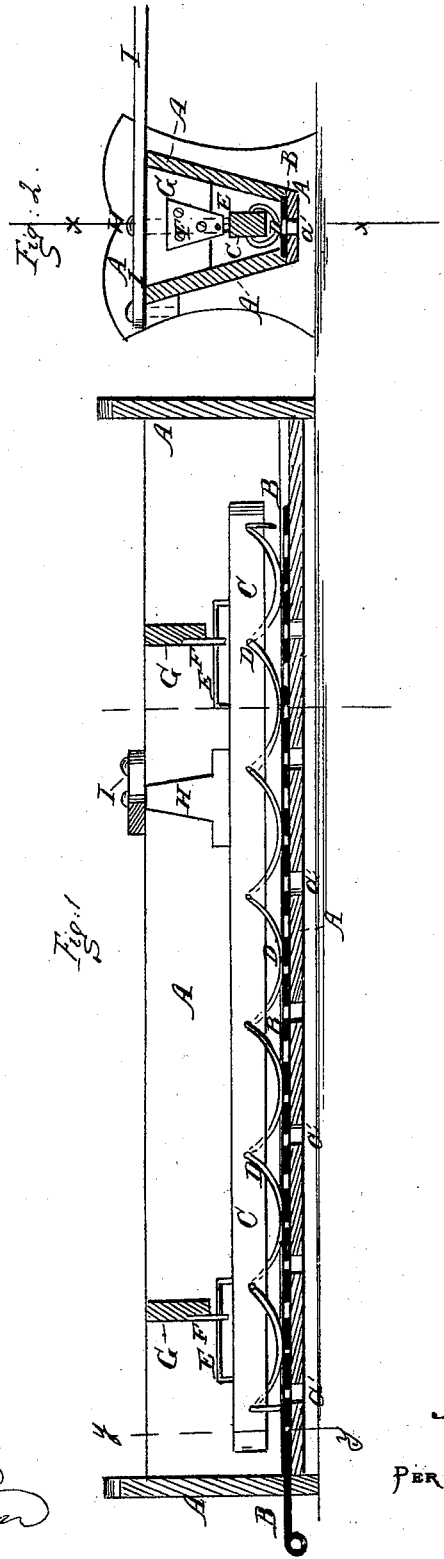

J. G. THOMPSON, OF STOCKTON, NEW YORK.

Letters Patent No. 92,401, dated July 6, 1869.

---

IMPROVEMENT IN SEED-SOWERS.

---

The Schedule referred to in these Letters Patent and making part of the same.

---

*To all whom it may concern:*

Be it known that I, J. G. THOMPSON, of Stockton, in the county of Chautauqua, and State of New York, have invented a new and improved Seed-Sower; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved machine, taken through the line *x-x*, fig. 2.

Figure 2 is a vertical cross-section of the same, taken through the line *y-y*, fig. 1.

Similar letters of reference indicate corresponding parts.

My invention has for its object to furnish a simple, convenient, and effective machine for sowing different kinds of seeds, which is designed to be carried by the operator, and operated to sow the seed by hand; and It consists in the construction and combination of the various parts of the machine, as hereinafter more fully described.

A represents a trough or open box, which I generally prefer to make about ten feet long, and the sides about four or five inches high.

In the bottom of the box A is formed a row of holes, *a'*, about two or three inches apart, through which the seed passes to the ground.

B is a sliding or false bottom to the box A, which may be made of wood or metal, and which lies flat upon the bottom of the box A.

In the slide B are formed two or more sets or series of different-sized holes, the holes of each size or series being at a distance apart equal to that of the holes *a'*; so that by simply adjusting the position of the slide B, the machine may be adjusted for sowing different-sized seeds.

C is a bar, which is made a little shorter than the interior of the box A, so that it may have a longitudinal movement within said box A.

D is a wire, which is passed through the bar C, passed spirally beneath said bar, again through it, and so on for the entire length of said bar C, forming a series of spiral loops, two or three inches in length, beneath the bar C.

To the upper side of the bar C, near its ends, are attached two long staples or loops, E, which pass through holes in the plates F, attached to the lower parts of the partitions or cross-bars G, attached to the sides of the box A, so that the bar C may be so suspended, that the spiral loops D may not touch, but may be close to the slide B, as shown in figs. 1 and 2.

H is a standard, the lower end of which is attached to the bar C; and to the other or upper end is pivoted the lever I.

One end of the lever I is pivoted to the side of the box A, or to a block or support attached to said side, and its other end projects at the other side of said box, in such a position that it may be conveniently reached and operated by the operator.

The machine is designed to be suspended from the shoulder of the operator by a strap, and the sowing is done as he walks across the field, the constant movement of the bar C insuring the continuous and uniform escape of the seed.

Having thus described my invention,

What I claim as new, and desire to secure by Letters Patent, is—

An improved seed-sowing machine, formed by the combination of the box A, adjustable slide B, having two or more sets or series of different-sized holes formed in it, spirally-looped wire D, suspended-bar C, and lever I, with each other, said parts being constructed and operating substantially as herein shown and described, and for the purpose set forth.

J. G. THOMPSON.

Witnesses:
F. M. BRIGGS,
H. W. SEYMOUR.